US009410570B2

(12) United States Patent
Atkins et al.

(10) Patent No.: US 9,410,570 B2
(45) Date of Patent: Aug. 9, 2016

(54) CLAMP

(71) Applicant: Specialised Petroleum Services Group Limited, Aberdeen, Aberdeenshire (GB)

(72) Inventors: James Edward Atkins, Aberdeen (GB); George Telfer, Aberdeen (GB); Edward Docherty Scott, Cardenden (GB)

(73) Assignee: Specialised Petroleum Services Group Limited, Aberdeen, Aberdeenshire (GB)

( * ) Notice: Subject to any disclaimer, the term of this patent is extended or adjusted under 35 U.S.C. 154(b) by 666 days.

(21) Appl. No.: 13/784,261

(22) Filed: Mar. 4, 2013

(65) Prior Publication Data

US 2013/0174408 A1 Jul. 11, 2013

Related U.S. Application Data

(62) Division of application No. 11/661,070, filed as application No. PCT/GB2005/003273 on Aug. 23, 2005, now Pat. No. 8,388,256.

(30) Foreign Application Priority Data

Aug. 24, 2004 (GB) .................................. 0418796.9

(51) Int. Cl.
*B25G 3/20* (2006.01)
*F16B 2/14* (2006.01)
(Continued)

(52) U.S. Cl.
CPC ................. *F16B 37/00* (2013.01); *B23P 11/00* (2013.01); *E21B 37/02* (2013.01); *F16B 2/065* (2013.01);
(Continued)

(58) Field of Classification Search
CPC .............. Y10T 403/14; Y10T 403/142; Y10T 403/7062; Y10T 403/7067; E21B 37/02; F16B 2/065; F16B 41/005; F16B 37/00
USPC ........... 403/17, 195, 256–263, 289, 292, 309, 403/312, 313, 335–337, 344, 373, 374.4, 403/379.2, 379.3, 408.1, DIG. 12, DIG. 13; 166/242.6; 411/104
See application file for complete search history.

(56) References Cited

U.S. PATENT DOCUMENTS 2,412,876 A 12/1946 Edwards
2,713,913 A 7/1955 Ragan
(Continued)

FOREIGN PATENT DOCUMENTS

FR 2755492 A1 5/1998
GB 2072296 A 9/1981
(Continued)

OTHER PUBLICATIONS

French Application Registration No. 96 13705 filed on May 11, 1996 entitled "Anti-Fraud System for Fluid Distribution Network" in its entirety, 20 pages.
(Continued)

*Primary Examiner* — Gregory Binda
*Assistant Examiner* — Nahid Amiri
(74) *Attorney, Agent, or Firm* — Osha Liang LLP

(57) ABSTRACT

A clamp holds two members together. The first member includes a recess into which a fastener is located. A bore is provided to the recess to allow a tool to be used to operate the fastener. The second member is arranged to accept the fastener and so join the members. The recess and bore are sized to prevent release of the fastener through the bore. In this way, the fastener cannot easily be removed or lost when the clamp is in use and is tamperproof. The clamp is used to hold portions of a sleeve around a body of the tool, and to hold scraper blades and/or brushes to the body.

10 Claims, 5 Drawing Sheets

(51) Int. Cl.
  *F16B 2/18* (2006.01)
  *F16B 7/04* (2006.01)
  *F16B 37/00* (2006.01)
  *E21B 37/02* (2006.01)
  *F16B 2/06* (2006.01)
  *F16B 41/00* (2006.01)
  *B23P 11/00* (2006.01)

(52) U.S. Cl.
  CPC ......... *F16B 41/005* (2013.01); *Y10T 29/49947* (2015.01); *Y10T 403/14* (2015.01); *Y10T 403/142* (2015.01); *Y10T 403/3953* (2015.01); *Y10T 403/7062* (2015.01); *Y10T 403/7067* (2015.01)

(56) References Cited

U.S. PATENT DOCUMENTS

| | | | |
|---|---|---|---|
| 2,781,100 A | 2/1957 | Pyle et al. | |
| 2,817,532 A * | 12/1957 | Hohwart et al. | 279/2.03 |
| 2,867,280 A | 1/1959 | Jarnett | |
| 2,888,989 A | 6/1959 | Park | |
| 2,936,031 A | 5/1960 | Seago | |
| 2,945,540 A | 7/1960 | Alexander et al. | |
| 2,997,762 A | 8/1961 | Imparato | |
| 3,011,556 A | 12/1961 | Best | |
| 3,032,114 A | 5/1962 | Best | |
| 3,554,589 A * | 1/1971 | Bogg | 403/313 |
| 3,818,999 A | 6/1974 | Garrett | |
| 3,827,492 A | 8/1974 | Hammon et al. | |
| 3,851,983 A * | 12/1974 | MacKenzie | 403/312 |
| 4,060,949 A * | 12/1977 | Busse | 403/231 |
| 4,189,000 A | 2/1980 | Best | |
| 4,261,666 A | 4/1981 | Katayama | |
| 4,291,764 A | 9/1981 | Pampell | |
| 4,300,271 A * | 11/1981 | Wohlhaupter | 384/7 |
| 4,479,538 A | 10/1984 | Coyle | |
| 4,515,212 A | 5/1985 | Krugh | |
| 4,572,291 A | 2/1986 | Robison | |
| 4,603,739 A | 8/1986 | Krugh | |
| 4,648,447 A | 3/1987 | Bishop et al. | |
| 4,706,748 A | 11/1987 | Harris | |
| 4,783,189 A * | 11/1988 | Bugg | 403/264 |
| 4,798,246 A | 1/1989 | Best | |
| 5,000,260 A | 3/1991 | Fontenot | |
| 5,062,734 A * | 11/1991 | Vanzee et al. | 403/313 |
| 5,067,845 A * | 11/1991 | Schlueter | 403/344 |
| 5,085,535 A * | 2/1992 | Solberg et al. | 403/24 |
| 5,158,407 A * | 10/1992 | Zettl | 409/234 |
| 5,531,536 A * | 7/1996 | Blanchfield et al. | 403/340 |
| 5,590,431 A * | 1/1997 | O'Connell | 5/658 |
| 5,711,046 A | 1/1998 | Potter | |
| 5,819,353 A | 10/1998 | Armell et al. | |
| 5,829,521 A | 11/1998 | Brown | |
| 5,848,947 A * | 12/1998 | Fornasiere et al. | 474/96 |
| 5,947,203 A | 9/1999 | Brown | |
| 6,070,835 A * | 6/2000 | Stillinger | 248/56 |
| 6,152,220 A | 11/2000 | Carmichael et al. | |
| 6,179,323 B1 * | 1/2001 | Shellabarger | 280/730.1 |
| 6,209,647 B1 | 4/2001 | Brown, Jr. | |
| 6,273,649 B1 | 8/2001 | Ziegler | |
| 6,343,648 B1 | 2/2002 | Carmichael et al. | |
| 6,464,010 B1 | 10/2002 | Brown | |
| 6,484,802 B1 | 11/2002 | McGarian et al. | |
| 6,546,581 B1 | 4/2003 | Swietlik et al. | |
| 6,655,462 B1 | 12/2003 | Carmichael et al. | |
| 6,779,943 B2 * | 8/2004 | Shoen | 403/344 |
| 6,851,472 B2 | 2/2005 | Hern et al. | |
| 7,197,806 B2 | 4/2007 | Boudreaux et al. | |
| 7,648,080 B2 | 1/2010 | Höhne et al. | |
| 7,831,899 B2 | 11/2010 | Humpleman et al. | |
| 2001/0040035 A1 | 11/2001 | Appleton et al. | |
| 2006/0260443 A1 | 11/2006 | Faries et al. | |

FOREIGN PATENT DOCUMENTS

| | | |
|---|---|---|
| GB | 2266864 A | 11/1993 |
| GB | 2340862 A | 3/2000 |
| JP | 07035276 B2 | 2/1995 |
| JP | 2002340255 A | 11/2002 |
| WO | 9510685 A2 | 4/1995 |
| WO | 0235055 A1 | 5/2002 |
| WO | WO 0235055 A1 * | 5/2002 |

OTHER PUBLICATIONS

"Locking function", Nord-Lock Bolt securing system, http://www.nord-lock.com/default.asp?id=3&language=4, Aug. 17, 2004, 2 pages.

International Search Report issued in PCT/GB2005/003273 on Nov. 21, 2005, 3 pages.

PCT Preliminary Report and Written Opinion issued in PCT/GB2005/003273 on Mar. 8, 2007, 6 pages.

* cited by examiner

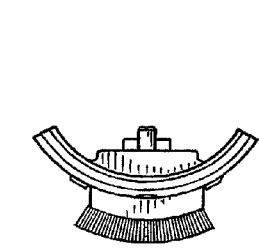
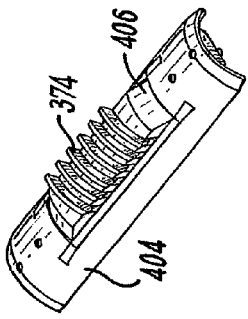
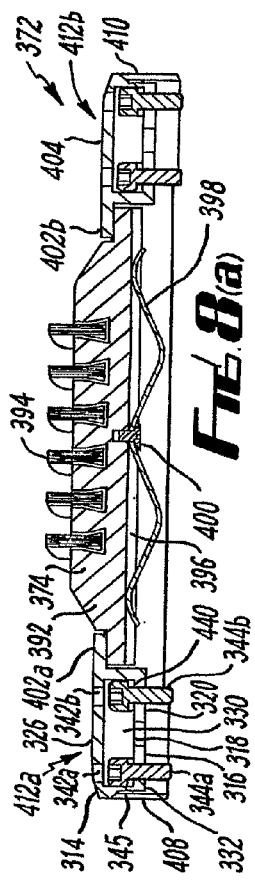
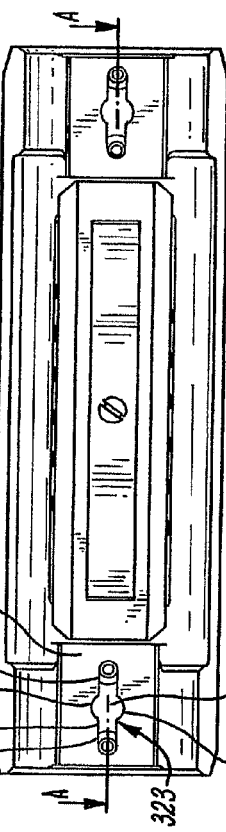
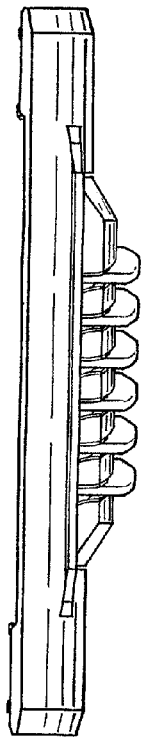
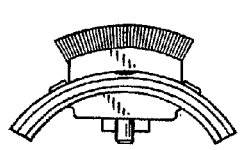

CLAMP

CROSS-REFERENCE TO RELATED APPLICATIONS

This application is a divisional application and claims benefit under 35 U.S.C. §120 to U.S. patent application Ser. No. 11/661,070, filed Nov. 22, 2007, issued as U.S. Pat. No. 8,388,256, issued on Mar. 5, 2013, which claims priority, pursuant to 35 U.S.C. §119(e), to PCT Application No. PCT/GB2005/003273 filed Aug. 23, 2005 and Great Britain Application No. 0418796.9 filed Aug. 24, 2004. All of these applications are incorporated by reference in their entirety.

The present invention relates to clamps and in particular, though not exclusively, to a c-ring clamp for engaging cylindrical portions of a sleeve located around a cylindrical body of a downhole tool.

BACKGROUND

In the drilling and production of oil and gas wells, downhole tools are located on work strings and run into well bores to perform various tasks within the well. Due to the cylindrical nature of the well bore together with the tubing used in the well, these tools typical comprise a cylindrical body located in the work string and annular or part annular components located on or around the body. When run in the well, these components provide for operation of the tool and a desired task is performed in the well.

In constructing the downhole tools, one example of a component is an annular sleeve. Relative movement between the sleeve and body operates the tool. The sleeve is typically formed as two semi-cylindrical portions held together along the two longitudinally arranged mating surfaces. The clamping of the portions is achieved by forming a hole through the portions at the mating surfaces. Typically the hole is perpendicular to the mating surface. A recess is formed at each end of the hole to allow a nut and bolt to be used as a fastener to clamp the portions together.

A disadvantage of this type of fixing is that the bolts are not properly constrained and consequently the nuts and/or bolts are easily lost and the assembled tool can be tampered with as the fastener is easily accessible. This can result in some tools being used with missing or loose fasteners which can result in failure of the tool downhole.

To reduce the number of fastenings, some sleeves are formed with the portions hinged so that fastenings are only required at a single mating surface. However, the single row of fasteners produce a sleeve with asymmetric loading and the fasteners can still be tampered with.

To prevent tampering with the fasteners it is known to use fasteners which can only be operated by a unique or specialist implement. Such fasteners have the disadvantage that the implement must be carried beside the tool for times when release of the fasteners is required. This is very inconvenient for tools which are assembled onshore and transported offshore for use.

A further example of an annular component is a scraper or brush. On a downhole cleaning tool there will be rows of brushes or scrapers generally biaised outwards to contact the wall of the liner or casing of the well. Movement of the brushes/scrapers over the wall clean debris and other detritus from the wall. On a typical tool, such as that illustrated in U.S. Pat. No. 4,648,447, the body is made up in sections which are threaded together. The cleaning elements, scrapers in this case, are slid over a section of the body to locate under lips or recesses and hold them in position. The second part of the body is then connected to the first and further lips retain an opposite end of the elements.

These tools have a major disadvantage in that the work string must be disconnected and reconnected everytime the cleaning elements need to be replaced. This is both time consuming and requires skilled engineers to ensure the biaised elements are correctly positioned when the tool is re-assembled.

Another method of retaining the cleaning elements without disconnecting the work string is to locate an annular sleeve over the ends of the elements. This is illustrated in U.S. Pat. No. 5,711,046. However, the annular sleeves have the same disadvantages as discussed hereinbefore.

BRIEF SUMMARY

It is an object of the present invention to provide a clamp which when in use, the fastener cannot be removed. The clamp is thus tamperproof.

It is a further object of at least one embodiment of the present invention to provide a downhole tool having a body on which is located a sleeve with resistance to backing out.

It is a further object of at least one embodiment of the present invention to provide a cleaning element for mounting on a downhole tool with resistance to backing out and does not require disconnection of the work string.

According to a first aspect of the present invention there is provided a clamp, the clamp comprising first and second connecting members and a fastener operable by a tool to engage the first and second connecting members, each member having an inner surface, an outer surface and a mating surface therebetween, the first connecting member including a fastener retainer located at the mating surface, the second connecting member having a recess at the inner surface proportioned to accept the fastener and a port at the outer surface proportioned to allow entry of the tool to operate the fastener, wherein an aperture between the recess and the port is sized to prevent release of the fastener through the port.

As the fastener can not pass out through the port the fastener cannot be pulled from the clamp via the outer surface where a user would have access. In this way the clamp is tamperproof, provides a resistance to backing out so that the fasteners will not be lost.

Preferably the recess includes oppositely directed engaging lips at the mating surface. This provides an anchor for the fastener. The lips will also leave an opening for the fastener to access the fastener retainer.

Advantageously the aperture comprises a portion of the port. In this way a single bore which is sized to accept the tool but is smaller than the fastener, is all that is required for the port to access the recess. The port may be a cylindrical bore.

In a preferred embodiment the fastener is a threaded bolt, operable to engage a threaded bore being the fastener retainer. This arrangement does not require a nut.

Preferably the fastener is operable by an Allen key. Allen keys are advantageous in that they are widely available, but can only operate if the exact size is used.

Preferably the fastener includes a locking washer. Thus the bolt is held closed once in the fastener retainer. Advantageously the washer could be sprung such that the fastener is advantageously held in the recess until the tool engages.

In an embodiment the connecting members are part cylindrical. Thus the outer surface is accessible and the inner surface is inaccessible when the clamp is in use.

In a preferred embodiment, the connecting members are c-rings and each member includes the recess and the port, wherein the port is arranged on the mating surface and the recess is arranged on a further mating surface so that, when the mating surfaces are engaged to the further mating surfaces, respectively, a c-ring clamp is provided.

According to a second aspect of the present invention there is provided a downhole tool comprising a substantially cylindrical body upon which is located a sleeve, the sleeve comprising at least two part cylindrical portions and at least two fasteners operable by a tool to engage adjacent portions, each portion having an inner surface, an outer surface and first and second mating surfaces therebetween for engagement with opposite mating surfaces of adjacent portions, a fastener retainer located at the first mating surface, a recess at the inner surface proportioned to accept the fastener and a port at the outer surface proportioned to allow entry of the tool to operate the fastener, wherein an aperture between the recess and the port is sized to prevent release of the fastener through the port.

Preferably the recess includes oppositely directed engaging lips at the mating surface. This provides an anchor for the fastener. The lips will also leave an opening for the fastener to access the fastener retainer.

Advantageously the aperture comprises a portion of the port. In this way a single bore which is sized to accept the tool but is smaller than the fastener, is all that is required for the port to access the recess. The port may be a cylindrical bore.

In a preferred embodiment the fastener is a threaded bolt, operable to engage a threaded bore being the fastener retainer. This arrangement does not require a nut.

Preferably the fastener is operable by an Allen key. Allen keys are advantageous in that they are widely available, but can only operate if the exact size is used.

Preferably the fastener includes a locking washer. Thus the bolt is held closed once in the fastener retainer. Advantageously the washer could be sprung such that the fastener is advantageously held in the recess until the tool engages.

According to a third aspect of the present invention there is provided a downhole tool comprising a substantially cylindrical body upon which is located a plurality of cleaning elements, each element comprising a cleaning member located on a base portion and at least two fasteners operable by a tool to engage each portion to the body, each portion having an inner surface, an outer surface and a portion mating surface for engagement with a body mating surface of the body, a fastener retainer located at the portion mating surface, a recess at the inner surface proportioned to accept the fastener and, a port at the outer surface proportioned to allow entry of the tool to operate the fastener, wherein an aperture between the recess and the port is sized to prevent release of the fastener through the port.

Preferably the recess includes oppositely directed engaging lips at the mating surface. This provides an anchor for the fastener. The lips will also leave an opening for the fastener to access the fastener retainer.

Advantageously the aperture comprises a portion of the port. In this way a single bore which is sized to accept the tool but is smaller than the fastener, is all that is required for the port to access the recess. The port may be a cylindrical bore.

In a preferred embodiment the fastener is a threaded bolt, operable to engage a threaded bore being the fastener retainer. This arrangement does not require a nut.

Preferably the fastener is operable by an Allen key. Allen keys are advantageous in that they are widely available, but can only operate if the exact size is used.

Preferably the fastener includes a locking washer. Thus the bolt is held closed once in the fastener retainer. Advantageously the washer could be sprung such that the fastener is advantageously held in the recess until the tool engages.

Preferably a pair of fasteners are located at each end of the cleaning element. More preferably a common recess is provided for each pair of fasteners.

Preferably, the cleaning member comprises a brush. Alternatively the cleaning member comprises a scraper. Advantageously the cleaning member is radially biaised from the body in use.

According to a fourth aspect of the present invention there is provided a method of fixing between first and second members, the method comprising the steps:
(a) inserting a fastener in a fastener-sized recess on an inner surface of the first member;
(b) bringing the members together so as to locate the fastener at a fastener retainer of the second member;
(c) inserting a tool through a port smaller than the recess on an outer surface of the first member;
(d) operating the fastening using the tool to engage the first member to the second member.

Preferably the fastener is a threaded bolt and the tool is an Allen key.

According to a fifth aspect of the present invention there is provided a method of retaining a substantially annular sleeve around a cylindrical body in a downhole tool, the method comprising the steps:
(a) locating a fastener into a substantially fastener-sized recess in an inner surface of at least two part cylindrical portions;
(b) arranging the part cylindrical portions around the body by locating adjacent mating surfaces of the portions together to provide the sleeve, while aligning each fastener with a fastener retainer at the mating surface of an adjacent portion;
(c) inserting a tool through a port smaller than the recess in an outer surface of a portion to engage a fastener;
(d) operating the fastener to partially engage the adjacent portions; and
(e) repeating steps (c) and (d) on adjacent portions until the portions are fully engaged to each other.

Preferably the fastener is a threaded bolt operated by an Allen key. In this way the fasteners need to be tightened sequentially to bring the portions together. This provides an additional anti-tamper and safety feature as the portions can only be released by sequentially slackening off each fastener.

In a preferred embodiment there are two part cylindrical portions forming the sleeve. This provides the simplest construction and quickest assembly.

According to a sixth aspect of the present invention there is provided a method of retaining cleaning members to a cylindrical body in a downhole cleaning tool, the method comprising the steps:
(a) locating a pair of fasteners into substantially fastener-sized recesses in an inner surface at each end, respectively of the cleaning member;
(b) arranging the cleaning member on the body and aligning the fasteners with a fastener retainer on the body;
(c) inserting a tool through a port, at an end of the member, smaller that the recess in an outer surface of the member to engage a fastener;
(d) operating the fastener to partially engage the end of the member and body;
(e) inserting the tool through a port, at an opposite end of the member to engage the respective fastener;
(f) operating the fastener to partially engage the respective end of the member and the body; and
(g) repeating steps (c) through (f) until the member is fully engaged to the body.

Preferably the fasteners are threaded bolts. More preferably there is a pair of fasteners at each end of the member.

BRIEF DESCRIPTION OF THE DRAWINGS

Embodiments of the present invention will now be described, by way of example only, with reference to the following drawings of which:

FIGS. 8(a)-(f) are illustrations of a cleaning member of the tool of FIG. 7.

DETAILED DESCRIPTION

Figure 1:
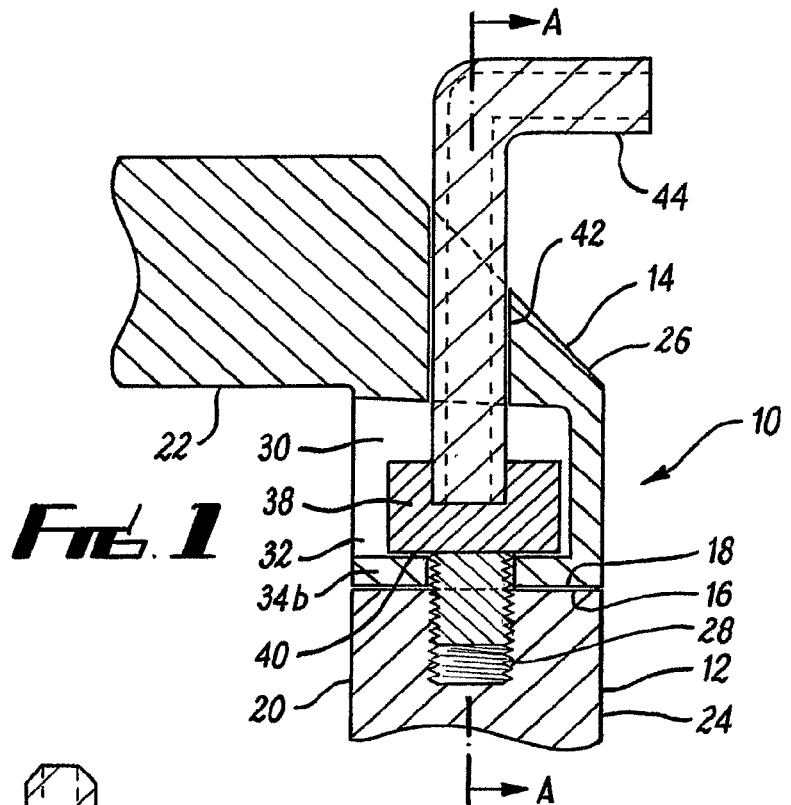
FIG. 1 is a cross-sectional view of a clamp according to an embodiment of the present invention.
Figure 2:
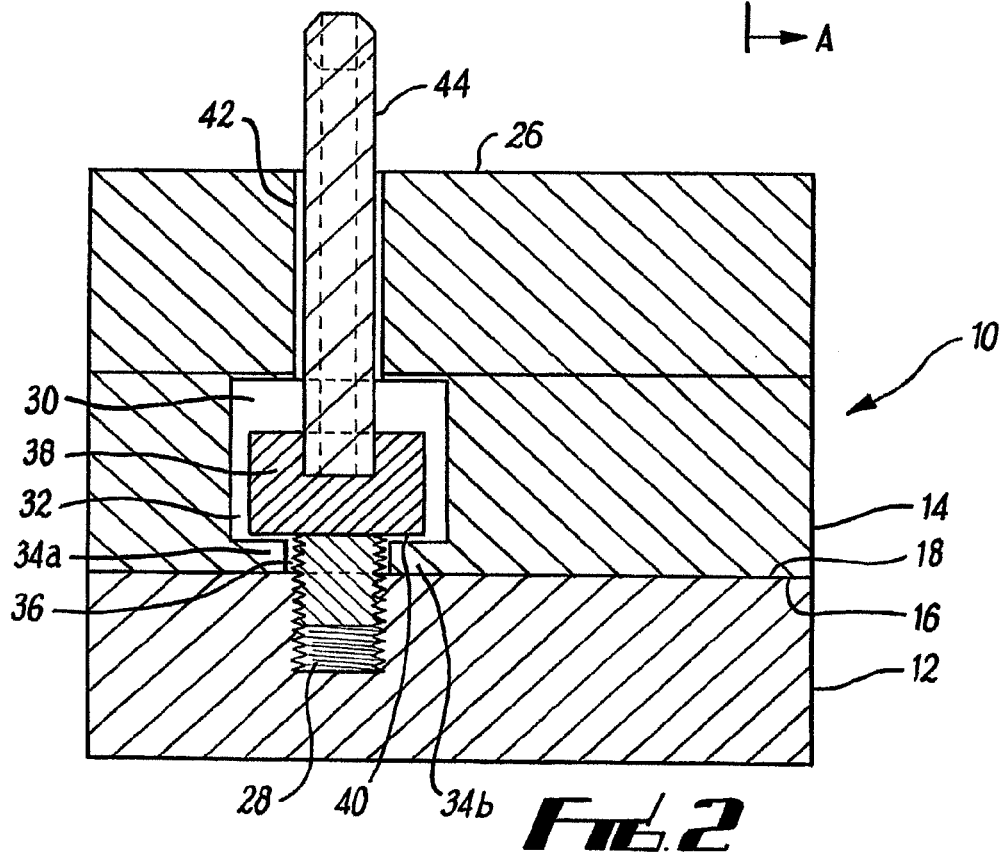
FIG. 2 is a cross-sectional view through the section A-A of FIG. 1.

Reference is initially made to FIGS. 1 and 2 of the drawings which illustrate a clamp, generally indicated by reference numeral 10, in accordance with an embodiment of the present invention. Numeral 10 comprises first 12 and second 14 mating portions which engage each other. It will be appreciated that mating portions 12,14 may be part of any system to be held together. In particular, portions 12,14 can be arranged around an object to provide a clamp.

Mating portions 12,14 are arranged to provide mating surfaces 16,18 respectively. Mating surfaces 16,18 are abutted and are located between inner surfaces 20,22 respectively and outer surfaces 24, 26 respectively.

Located in the first mating portion 12 is a fastener retainer 28, this being a threaded hole to receive a threaded bolt. The fastener retainer 28 is located upon the mating surface 16. To access retainer 28, fasteners must be located through the mating surfaces 16,18 from the second portion 14 to the first portion 12. It will be appreciated that although the diagram illustrates that the mating surfaces 16,18 are of an identical size and shape this may not necessarily be the case and as long as there is a portion of a mating surface where the two can come together and the retainer 28 can be accessed the invention will be met.

Located in the second portion 14 is a recess 30. Recess 30 is a hollowed out section of portion 14. It is hollowed out from the inner surface 22. The recess 30 is bounded at a base 32 by a pair of overhanging members or lips 34a,b. Lips 34a,b provide the mating surface 18. The lips 34a,b are separated by a passageway or slot 36.

A fastener in the form of a bolt 38 is located in the recess 30 through the slot 36 and in the figures is shown as screwed into the retainer 28 by passing across the mating surfaces 16,18. The bolt 38 provides a lower circular edge 40 which is arranged to rest upon the lips 34a,b when located in the retainer 28 and this provides a bias or downward force to hold the portion 14 against the portion 12 to operate the clamp 10.

Portion 14 further includes a cylindrical bore 42. Bore 42 originates in the recess 30 and ends on the outer surface 26. This bore 42 allows access for a tool 44, such as an Allen key, to be inserted into the recess 30 from the outer surface 26.

In use, the bolt 38 is pushed into the recess 30 from the inner surface 22. When inserted, the bolt 28 is slid through slot 36 into the recess 30 and is located in a position above the position of the retainer 28. From the drawings it is apparent that the bolt 38 is sized to fit neatly within the recess 30 and thus will be held within the recess 30 until the portions 12,14 are brought together. Access to insert the bolt 38 into the recess 30 is transverse to the direction of engagement of the bolt 38 and thus is parallel to the mating surfaces 16,18.

Once retainer 38 is located in recess 30, portions 12,14 are brought together to mate. Allen key 44 is then introduced through the bore 42 from the outer surface 26. It is noticed that no access is required from the inner surface from this point onwards. Bore 42 is sized so that it is smaller than the head size of the bolt 38 thus the bolt 38 can not be released through the bore 42 to the outer surface 26. In fact, there is no available passage for the fastener to the outer surface.

It will be recognised by those skilled in the art that Allen Key 44 may be referred to as an Allen wrench, hex key or hex head wrench and is a well known tool used to drive screws and bolts with a hexagonal socket in the head. Allen keys are used as they provide the known advantages of six contact surfaces between bolt and driver; contact surfaces of the bolt are protected from external damage; the bolt can be inserted into its socket using the key; torque applied constrained by the length and thickness of the key; very small bolt heads are accommodated; and can be used with a headless screw.

The Allen key 44 is located within the bolt 38 via a hex recess located in the top of the bolt 38. Turning the Allen key 44 will engage the bolt 38 into the fastener retainer 28 by the mating of the screw threads in each. The bolt 38 can be tightened until the edge 40 applies sufficient pressure on the lips 34a,b to secure engage the mating surfaces 16,18 to each other. Thus portions 12,14 are now clamped together.

The Allen key 44 can then be removed. With the clamp 10 now secured it is impossible to access the fastener from the outer surface in order to release it without having the Allen key. Further in the event that, for any reason, the fastener 38 loosens and releases, the fastener 38 will not be lost, it will be held within the recess 30 until such time as a further Allen key 44 can be found and used to tighten the clamp 10 again.

Figure 3:
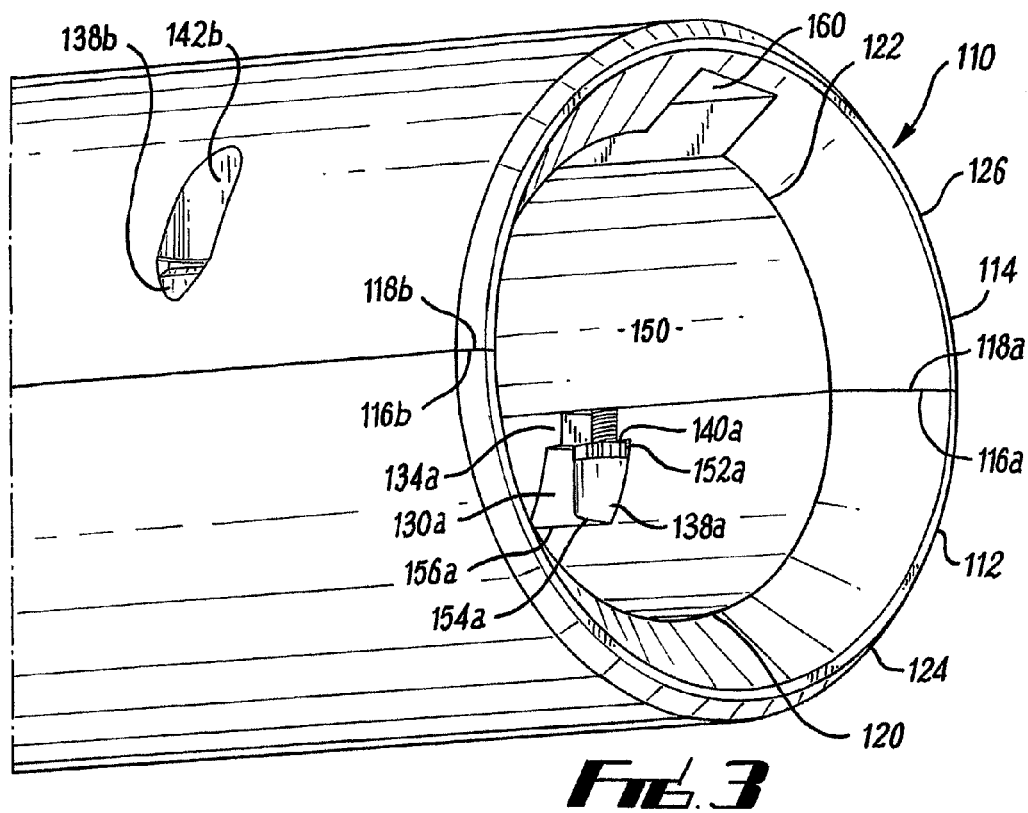
FIG. 3 is an illustration of a c-ring clamp according to an embodiment of the present invention.
Figure 4:
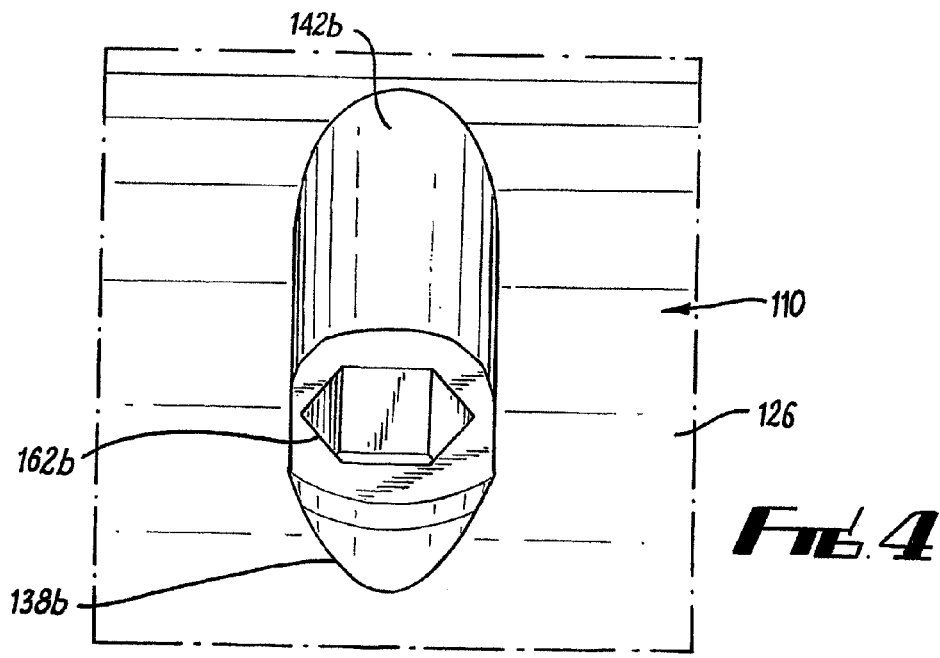
FIG. 4 is an illustration of the port of the c-ring clamp of FIG. 3.

Reference is now made to FIGS. 3 and 4 of the figures which illustrate a c-ring clamp, generally indicated by reference numeral 110, according to a further embodiment of the present invention. C-ring clamp 110 is similar to the clamp 10 shown in FIGS. 1 and 2 and thus for clarity like parts will be given the same reference numeral with the addition of 100. Each mating portion 112,114 comprises a semi-cylindrical portion having an outer surface 124,126 and an inner surface 120,122. The portions 112,114 have abutting mating surfaces 116,118.

The portions 112,114 provide a hollow cylindrical section having a bore 150 formed from the inner surfaces 120,122. In this embodiment, there are now four mating surfaces 116a,b and 118a,b as there are two points where the portions 112,114 now abut to form the c-ring clamp 110. Each mating surface 116a,b,118a,b is located against an opposite mating surface 118a,b,116a,b.

At the mating surfaces 116a,118b there is located recesses 130a,b (130b is not shown in the diagram as it is hidden from view). The arrangement of the fasteners 138a,b is identical to that of the bolt 38 and thus it will be appreciated there are now two fasteners 138a,b to hold the c-ring clamp 110 together.

In this embodiment, the fasteners 138a,b are threaded bolts which each include a lock washer 152a,b. The lock washers are preferably Nord-Lock® washers which positively lock the fastener in place and further prevent backing off. The lock washers 158*a,b*, when the bolts 138*a,b* are tightened by the Allen key (not shown in this figure), will hold the retainer 138*a,b* in the engaged position against the lips 134*a,b*.

A Nord-Lock® washer comprises two interlocking rings. The mating surfaces are cams having an angle of movement or rise, "A". The outer surfaces are ridged to help grip between the fastener head and the workpiece. A Nord-Lock® washer is selected such that the angle "A" is greater than the pitch angle "B" of the threads of the fastener. The key is the difference in angles. Since angle "A" is larger than the angle "B", the pair of washers expand more than the corresponding pitch of the thread. This tension makes the bolt self-locking.

In an alternative embodiment lock washers 152*a,b* are sprung locking rings. Each sprung locking ring provides the abutment edge 140*a,b* to the lips 134*a,b*. Each sprung locking ring also insures that the fastener 138*a,b* will remain in the recess 130*a,b* until the pieces 112,114 are brought together. This is because the sprung action biases the head 154*a,b* of the fastener 138*a,b* to the roof 156*a,b* of the recess 130 opposite the mating surface 116*a,b*. Further the locking ring 152*a,b*, when tightened by the Allen key (not shown in this figure), will hold the retainer 138*a,b* in the engaged position against the lips 134*a,b*.

Although they are not shown in the figures, it will be appreciated that the mating surfaces 116*b*,118*a* include fastener retainers 128*a,b*. The fastener retainers 128*a,b* will be located below the fasteners 138*a,b* in an identical manner to that shown in clamp 10.

In use, retainers 138*a,b* are pushed into the recesses 130*a,b* and will be held in place by the locking rings 152*a,b* as they bias the heads of the fasteners 138*a,b* to the roof of the recesses 130*a,b*. The two portions 112, 114 are then brought together to mate the surfaces 116*a*,118*a* and 116*b*,118*b*. The fasteners 138*a,b* in the form of bolts will be located at fastener retainers 128*a,b*.

The portions 112,114 will be used to clamp around a cylindrical or similar shaped body. Alignment means 160 can be located on the inner surface 120 to engage further with the body to be clamped. Similarly, although not shown, the mating surfaces 116,118 could be keyed to improve the accuracy of the mating of the two portions 112,114. Once located, an Allen key (not shown) is inserted through cylindrical bore 142*b* to engage a hex fitting 162*b* in the fastener 138*b* as described hereinbefore. This is as illustrated in FIG. 4, where the head of the fastener 138*b* can be seen through the bore 142*b* and is accessible to an Allen key, but the head is too broad to pass through the bore 142*b*.

Each fastener 138 can only be tightened a short distance due to the c-ring nature of the portions 112,114. Thus the fasteners 138 must be tightened gradually in a cyclic pattern until all are fully engaged. Once fully tightened the fasteners 138 clamp the mating surfaces 116,118 together to provide a c-ring clamp 110.

By forming two part cylindrical portions which mate together a further safety feature is provided in the clamp 110. In particular, even with a tool available to release the fasteners 138 from the outer surface 124, a user will need to be aware that each fastener has to be released consecutively and separately by a small amount in order to open the clamp 110. Such a procedure to release the clamp 110 prevents a user successfully tampering with a single fastener 138 on the clamp 110.

As with the clamp 10 of FIGS. 1 and 2, the clamp 110 FIGS. 3 and 4 does not allow the fasteners 138 to be removed through the bore 142 and thus the fasteners cannot be removed during use.

Figure 5:
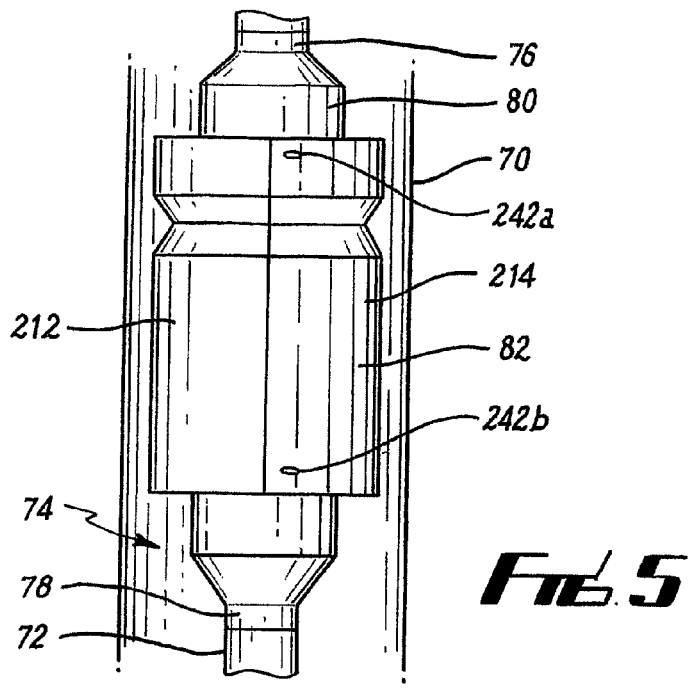
FIG. 5 is an illustration of a downhole tool according to an embodiment of the present invention.
Figure 6:
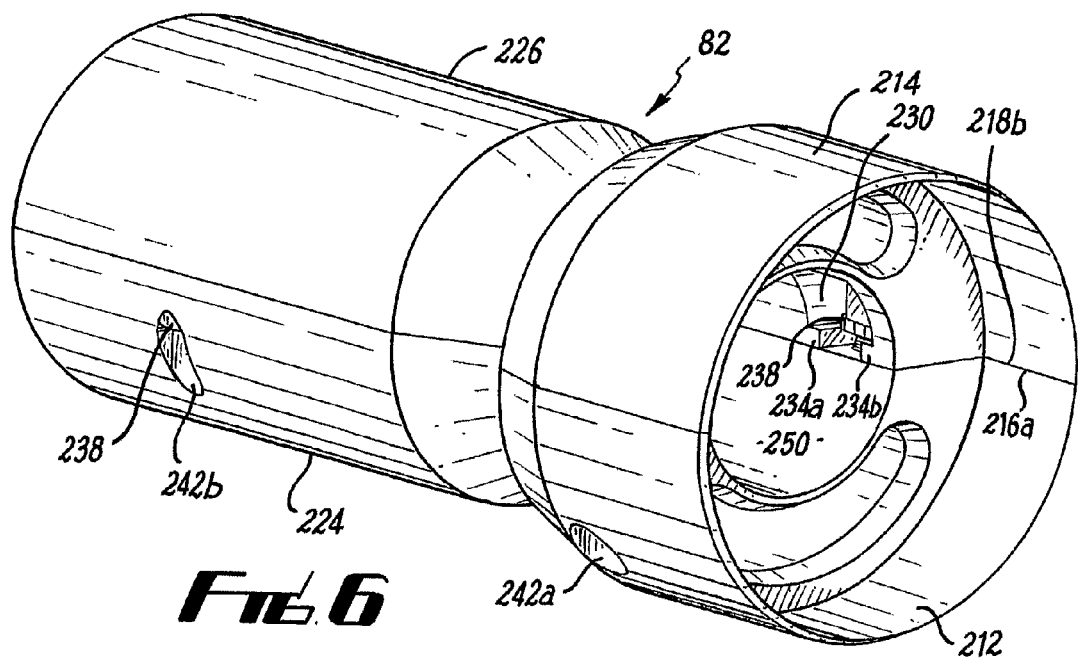
FIG. 6 is an illustration of the sleeve of FIG. 5.

Reference is now made to FIGS. 5 and 6 of the drawings. FIG. 5 shows a well bore 70 in which is located a work string or drill string 72 having mounted thereon a downhole tool, generally indicated by reference numeral 74. Tool 74 is located on the work string by virtue of pin and box sections 76, 78 as is known in the art.

The tool 74 comprises a substantially cylindrical body 80 having a sleeve 82 located thereupon. Tool 74 operates by movement of the body 80 relative to the sleeve 82. Sleeve 82 is formed by two semi-cylindrical portions 212 and 214. Portions 212 and 214 are joined as described hereinbefore with reference to FIGS. 1 to 4. Bores 242*a,b* are seen on the portion 214 and are tool access points to attach the portions 212,214 together around the body 80, to form the sleeve 82.

Reference is now made to FIG. 6 of the drawings which illustrates the sleeve 82 in greater detail. Like parts to those of the earlier figures will be given the same reference numerals now with the addition of 200. Sleeve 82 is constructed in an identical manner to the c-ring clamp in FIGS. 3 and 4. Fasteners 238 are bolts having locking rings 252, and are operated by an Allen key located through the bores 242. In the sleeve 82, there are four cylindrical bores 242. There are three bores positioned equidistantly along each of two longitudinal axes of the sleeve 82 where the portions 212,214 join.

In use, the fasteners 238 will be located in each of the four recesses 230 and the portions 212, 214 located around the body 80. A single Allen key is required to tighten the sleeve 82 as only a single fastener can be tightened at one time and the fasteners must be tightened sequentially by graded amounts in order that the mating surfaces 216,218 join successfully to provide a perfect sleeve 82 with a continuous outer surface 224,226. Once constructed and the Allen key is removed, the sleeve cannot be tampered with as access to the fasteners is only available through the cylindrical bores and the fasteners cannot be removed through these bores. The fasteners are permanently located in the recesses 230 and thus are securely located within the tool and cannot be released to catch anywhere in the well bore 70. Further if someone was to tamper with the tool or sleeve in any way they could only gain access to the fasteners to release them if they had a suitable sized Allen key. Even when they had such an Allen key, unfastening a single fastener would not release the portions 212,214 as each fastener needs to be loosened sequentially. This helps prevent tampering of the tool or accidental release of the sleeve 82.

Reference is now made to FIG. 7 of the drawings which illustrates a downhole cleaning tool at FIG. 7(*a*), with the cross section view of the tool at FIG. 7(*b*). The cleaning tool 360 comprises a cylindrical body 362 having a first end 364 including the box section 366 for connection to a workstring (not shown). At the opposing end 368 there is located a box section 370 for connection to a lower workstring. This tool 360 can be inserted into a workstring and run into a wellbore. The body 362 includes a longitudinal bore 370 axially therethrough to provide an internal passageway for fluids through the cleaning tool communicating with the workstring.

Located on the body 362 are cleaning elements 372, 382. The cleaning elements comprise brushes 374 and scrapers 384. Brushes 374 include six rows of bristles which clean wellbore casing when held against the wellbore casing and lining. Each set of bristles is located on a pad or element 376. There are three elements 376 circumferentially around the body 362 at locations longitudinally spaced along the body 362. While three elements 376 are shown at each location there may be a number of portions 376 incorporated depending on the coverage required around the body 362. In an alternative embodiment for instance four pads with brushes 374 will be arranged at each location. Further it will be noted that the brushes 374 at each location are not collinear. That is a rotational alignment has been made between each set of brushes. This is to ensure complete circumferential coverage of the body 362 by the brushes 374. Similarly the scrapers 382 comprise blades 384 being arranged in triplicate around the body 362 at three longitudinally spaced locations. Again the blades 384 are misaligned in the longitudinal access of the tool to ensure complete circumferential coverage of the body 362 by the blades 384. Three locations are illustrated for both the brushes 374 and the scrapers 382. It will be appreciated that any number of those cleaning elements may be incorporated. Additionally the tool is supplied with two stabilisers 386a, b together with a fixed stabiliser including a cutting blade 388 toward the forward end 368 of the tool. Additionally also there is a further fixed stabiliser including a magnet holder 390 located toward the upper end 364 of the tool. The magnet holder 390 will attract ferrous materials dislodged by the scrapers and brushes and thereby remove such materials from the well fluid in the wellbore.

Reference is now made to FIG. 8 of the drawings which illustrates a single cleaning element 372. Although element 372 will be described with reference to brushes it will be appreciated that the brush portion 374 can be replaced by the scraper blades 384. Element 372 comprises a brush portion 374 including a plate 392 into which is fixed six brushes 394. Attached to the rear 396 of the plate 392 is a spring in the form of linear expander 398 arranged longitudinally on the plate 392 and fixed by a screw 400. Such a spring 398 provides a bias to force the plate 392 against lips 402a 402b of a bridge clamp 404.

Figures 7A, 7B:
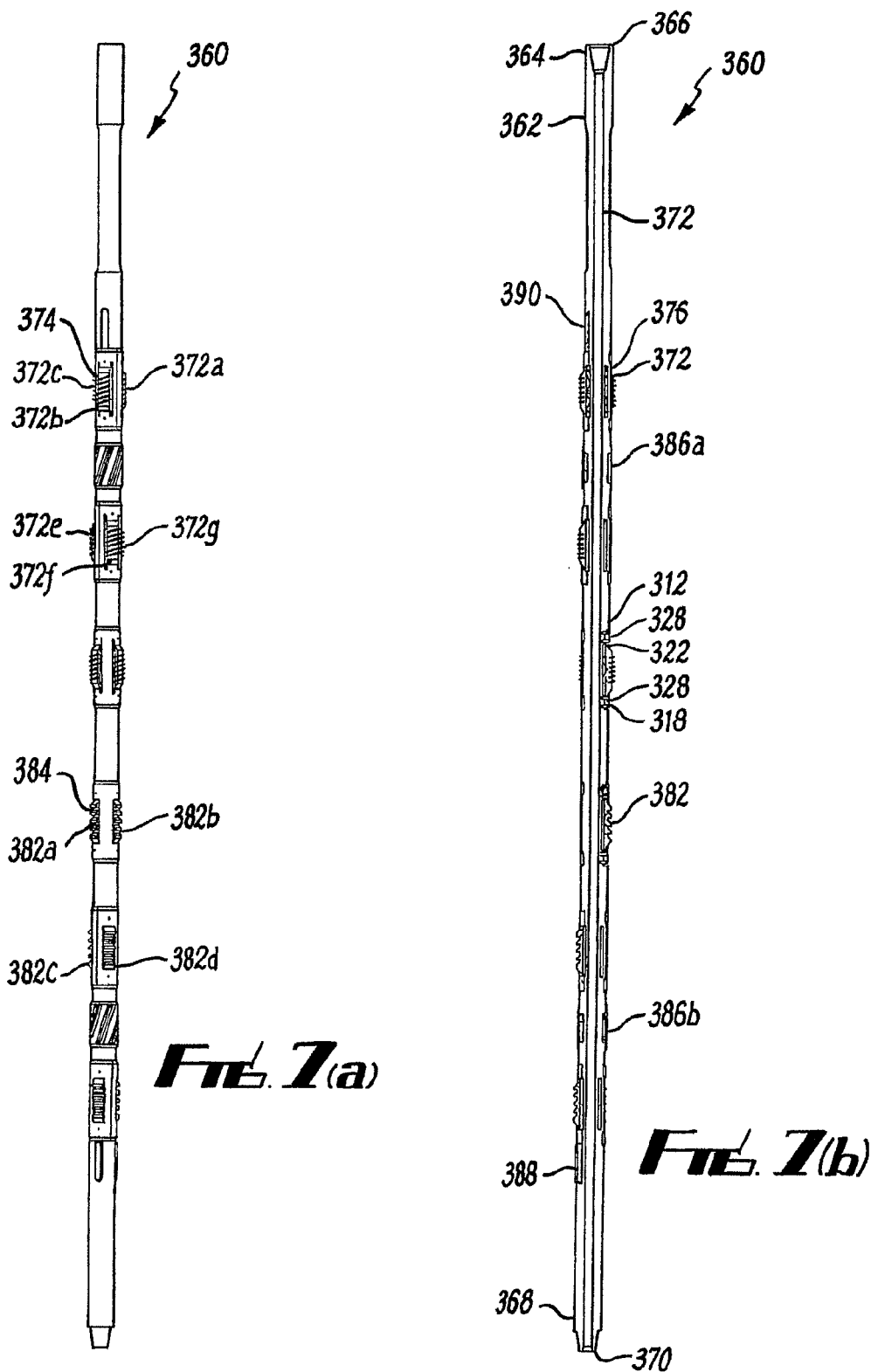
FIGS. 7(a) and 7(b) are illustrations of a downhole cleaning tool according to an embodiment of the present invention.

Bridge clamp 404 comprises a part cylindrical section (best seen in FIG. 8f) which includes an aperture 406 in which is held the plate 392 and brushes 374. It is the bridge clamp 404 which includes the clamping system according to an embodiment of the present invention. At each end 408, 410, respectively of the clamp 404 is located a clamping system generally indicated by reference numeral 412a, b. Like parts of the clamping system 412 to the system illustrated in FIG. 1 have been given the same reference numeral with the addition of 300 to aid clarity. The clamping system 412 comprises a first mating portion 314 designed to be held against a second mating portion being the body 362. The second mating portion is illustrated in FIG. 7(b) as that section of the body behind the elements 372. Mating portion 314 provides a mating surface 316 to abut a mating surface 318 on the body 362. The mating surfaces 316, 318 are abutted and are located between inner surfaces 320 and 322 respectively.

Located in the body mating portion 312 are pairs of fastener retainers 328. The retainers are arranged on the body 362 as a pair of threaded recesses and aligned for each receiving a threaded bolt 344a, b. The fastener retainers 328 (shown in FIG. 7(b)) are located upon the mating surface 318. To access the retainers 328, fasteners must be located through the mating surfaces 316, 318 from the bridge clamp 404 to the body 362 across the portions 314 and 312. Located in the portion 314 is a recess 330. The recess 330 (shown in FIG. 8(a)) is a hollowed out section of portion 314. It is hollowed out from the inner surface 322 and is more clearly seen in FIG. 8(b). On inner surface 322 there is a common access point 323. The access point 323 has a larger portion in the centre 325 and narrower portions at each end 327a, b as illustrated. These narrowed portions 327a, b define a pair of overhanging members or lips 334a, b. On the base 332, lips 334a, b provide the mating surface 318. Lips 334a, b are separated by a passageway or slot 336.

Fasteners in the form of bolts 344a, b are each located in the recess 330 by insertion through the gap 325 in the slot 336. Each bolt 344a, b, when in position, can be screwed into the respective retainers 328 on the body 362. Each bolt 344a, b provides a lower circular edge 440 which is arranged to rest upon the lips 334a, b when located in the retainer 328 and this provides a bias or downwards force to hold the portion 314 of cleaning element 372 (shown in FIG. 8(a)) against the portion 312 located on cylindrical body 362 (shown in FIG. 7(b)) and thus operate as a clamp. Portion 314 of cleaning element 372 further includes two cylindrical bores 342a, b. Each bore 342 extends from the recess 330 to the outer surface 326. These bores 342 each allow access for a tool, such as an Allen key, to be inserted into the recess 330 from the outer surface 326.

In use plate 392 is located against lips 402 so that the brushes 394 protrude from the outer surface 326. Bolts 344 are located into the recess 330 through the aperture 325 and slid across the slot 336 to respective ends thereof. This occurs at each end 408, 410 of the element 372. Each bolt 344a, b is sized to fit neatly within the recess 330. Each bolt 344 if further held in position by a locking washer 345 as described herein before. Once each bolt 344 is located in the recess 330 respectively the element 372 is brought against the body 362 so that the bolts 344 align with the fastener retainers 328. The Allen key is then introduced through a first bore 342a and inserted into the respective fastener 344a and turned to engage the element 372 to the body 362. It should be noted that only a partial number of turns of the bolt 344a are required, then the tool should be removed through the bore 342a and inserted respectively into the other bores 342b at either end of the plate to successively tighten all four bolts 344 in turn in a cyclic pattern until the plate 372 is held firmly against the body 362. It will be recognised that the Allen key has a clearance fit in the bore 342 while the bolt 344 has a head larger than the bore 342 so that each bolt 344 cannot be released from the plate 372 once it has been fastened to the body 362.

Once the bridge clamp 404 is secured it is impossible to access any of the bolts 344 from the outer surface 326 in order to release the clamp 404 without having the required tool i.e. the Allen key. But in the event that any fastener 344 begins to loosen and release the respective fastener 344 will not be lost, it will be held within recess 330 until such time as a further Allen key is used to tighten the clamp 404 back into position.

In the event that the brushes 394 wear to such an extent that they need to be replaced, the above described process can be reversed. In this respect the Allen key is inserted through each of the bores 342 in sequence to slacken the fasteners 344 and remove the clamp 404, from the body 362. The plate 392 including the brushes 394 can therefore be replaced easily and a new plate 392 be inserted behind the lips 402 and the plate 404 connected to the body 362 as described herein before.

It will be recognised that this arrangement allows any plate 392 and brush set 394 or scraper 382 to be replaced without requiring all the brushes or scrapers to also be replaced either on a row or across the entire body. Further this arrangement allows the brushes and/or scrapers to be replaced without disconnecting the body 362 from the workstring.

The principal advantage of the present invention is that it provides a clamping system from which the fastener used for the clamp cannot be easily removed or lost when the clamp is in use. This gives a tamperproof feature to the clamp.

A further advantage of at least one embodiment of the present invention is that by providing a c-ring clamp with fasteners over at least two surfaces, the load is spread during the clamping operation.

It is yet a further advantage of at least one embodiment of the present invention in providing a downhole tool including a sleeve which has the advantageous clamping means. Such a sleeve is tamperproof while providing a secure fixing wherein the fasteners cannot back off and be released into the well bore. Further this arrangement provides an additional safety feature in that no one single fastener can be removed. They must all be removed consecutively.

It is still a further advantage of at least one embodiment of the present invention in providing a downhole cleaning tool where the cleaning members can be replaced without disassembling the work string and will not release during use.

Various modifications may be made to the invention herein described without departing from the scope thereof. For example though bolts have been described as the fasteners it will be appreciated that other screws may be used as could other fastening means such as clips, or other types which retain two surfaces together and are operated by a tool. Additionally while a hex fitting operated by an Allen key is described, other fittings such as slots, posi-drives and Phillips@ screw heads could be used in conjunction with the relevant screw drivers as the tool.

The invention claimed is:

1. An apparatus comprising:
  a substantially cylindrical body upon which is located a sleeve, the sleeve comprising:
    two semi-cylindrical portions; and
    at least two fasteners operable by a tool to engage adjacent the two semi-cylindrical portions,
    each semi-cylindrical portion having an inner surface, an outer surface and first and second mating surfaces therebetween for engagement with opposite mating surfaces of adjacent portions; and
    each semi-cylindrical portion further comprising:
      a fastener retainer located at the first mating surface;
      a recess at the inner surface proportioned to accept one of the at least two fasteners; and
      a bore at the outer surface proportioned to allow entry of the tool to operate the fastener,
        wherein the bore is sized to prevent release of the fastener through the bore.

2. The apparatus as claimed in claim 1 wherein the recess includes oppositely directed engaging lips at the mating surface.

3. The apparatus as claimed in claim 1 wherein the fastener is a threaded bolt, operable to engage a threaded bore, wherein the fastener retainer is the threaded bore.

4. The apparatus as claimed in claim 1 wherein the tool is an Allen key.

5. An apparatus comprising:
  a substantially cylindrical body upon which is located a plurality of cleaning elements, each cleaning element comprising:
    a pair of base portions, each base portion having a clamping system to affix the cleaning element to the substantially cylindrical body; and
    a cleaning member located between the pair of base portions,
    each base portion comprising an inner surface, an outer surface, and a portion mating surface for engagement with a body mating surface of the substantially cylindrical body, each base portion further comprising:
      at least two fasteners operable by a tool to engage the cleaning element to the substantially cylindrical body;
      a recess at the inner surface proportioned to accept the at least two fasteners; and
      a bore for each fastener at the outer surface proportioned to allow entry of the tool to operate each fastener,
        wherein the bore for each fastener is sized to prevent release of each fastener through the bore;
    wherein at least two fastener retainers proportioned to accept the at least two fasteners are located at the body mating surface of the substantially cylindrical body.

6. The apparatus as claimed in claim 5 wherein the recess includes oppositely directed engaging lips at the portion mating surface.

7. The apparatus as claimed in claim 6 wherein the at least two fasteners are located in the recess through an aperture in the portion mating surface.

8. The apparatus as claimed in claim 5 wherein each fastener is a threaded bolt and each fastener retainer is a threaded bore, wherein each fastener is operable to engage each threaded bore.

9. The apparatus as claimed in claim 5 wherein the tool is an Allen key.

10. The apparatus as claimed in claim 5 wherein the cleaning member is selected from the group consisting of a brush and a scraper.

* * * * *